(12) United States Patent
Bellio et al.

(10) Patent No.: US 12,239,937 B2
(45) Date of Patent: Mar. 4, 2025

(54) SEPARATOR ANALYSIS METHOD AND APPARATUS

(71) Applicant: PIOVAN S.P.A., Venice (IT)

(72) Inventors: Enrico Bellio, Treviso (IT); Davide Cappellini, Cremona (IT)

(73) Assignee: PIOVAN S.P.A., Venice (IT)

( * ) Notice: Subject to any disclaimer, the term of this patent is extended or adjusted under 35 U.S.C. 154(b) by 412 days.

(21) Appl. No.: 17/783,441

(22) PCT Filed: Mar. 3, 2021

(86) PCT No.: PCT/IB2021/051770
§ 371 (c)(1),
(2) Date: Jun. 8, 2022

(87) PCT Pub. No.: WO2021/176370
PCT Pub. Date: Sep. 10, 2021

(65) Prior Publication Data
US 2023/0023589 A1    Jan. 26, 2023

(30) Foreign Application Priority Data

Mar. 6, 2020 (IT) .................. 102020000004813

(51) Int. Cl.
*B01D 53/26* (2006.01)
*B01D 53/04* (2006.01)
*B01D 53/72* (2006.01)
(Continued)

(52) U.S. Cl.
CPC .......... *B01D 53/261* (2013.01); *B01D 53/04* (2013.01); *B01D 53/0454* (2013.01);
(Continued)

(58) Field of Classification Search
CPC .... B01D 53/261; B01D 53/265; B01D 53/72; B01D 53/04; B01D 53/0454;
(Continued)

(56) References Cited

U.S. PATENT DOCUMENTS 4,839,969 A * 6/1989 Hahn ................. B29B 9/16
34/169
7,007,402 B1 * 3/2006 Gillette ................. F26B 21/083
34/169
(Continued)

FOREIGN PATENT DOCUMENTS

CN    208100830 U  * 11/2018
CN    109529529 A     3/2019

OTHER PUBLICATIONS

Machine-generated English translation of CN208100830U, published Nov. 16, 2018.*
(Continued)

*Primary Examiner* — Frank M Lawrence, Jr.
(74) *Attorney, Agent, or Firm* — Oliff PLC

(57) ABSTRACT

An analysis method and apparatus are disclosed for analysing an absorption filtering medium that filters volatile organic substances in a process gas in a plant for dehumidifying polymer granules, with a fan that generates a flow of gas through the filtering medium, an analyzer of the total concentration of the organic carbon, a sensor to detect the pressure downstream of the filtering medium, in which the saturation state and/or the absorbent capacity and/or the deterioration over time of the filtering medium is determined by a comparison of the measured concentrations of total organic carbon in the flow of gas upstream and downstream of the filtering medium.

20 Claims, 11 Drawing Sheets

(51) Int. Cl.
*B29B 9/16* (2006.01)
*B29B 13/06* (2006.01)

(52) U.S. Cl.
CPC ........... *B01D 53/265* (2013.01); *B01D 53/72* (2013.01); *B29B 9/16* (2013.01); *B29B 13/065* (2013.01); *B01D 2253/102* (2013.01); *B01D 2257/7025* (2013.01); *B01D 2257/708* (2013.01); *B01D 2258/06* (2013.01); *B29B 2009/168* (2013.01)

(58) Field of Classification Search
CPC ...... B01D 2253/102; B01D 2257/7025; B01D 2257/708; B01D 2258/06; B01D 2257/7022; B01D 2253/108; B01D 53/30; B01D 2257/7027; B29B 9/16; B29B 13/065; B29B 2009/168; B29B 2013/005; B29B 13/00; F26B 2200/08; F26B 21/083; F26B 25/007; F26B 17/12; F26B 21/04; Y02P 70/10; Y02C 20/20
USPC ....... 96/109, 111; 95/8–12, 116; 34/80, 472, 34/473
See application file for complete search history.

(56) References Cited

U.S. PATENT DOCUMENTS

| | | | | |
|---|---|---|---|---|
| 2001/0003874 | A1* | 6/2001 | Gillette | B29B 13/065 34/169 |
| 2003/0221330 | A1* | 12/2003 | Arnold | B29B 13/065 34/58 |
| 2004/0040172 | A1* | 3/2004 | Crawford | F26B 21/083 34/473 |
| 2018/0106545 | A1* | 4/2018 | Bellio | F26B 21/12 |
| 2018/0290104 | A1* | 10/2018 | Jong | B01D 53/30 |
| 2023/0191663 | A1* | 6/2023 | Bellio | F26B 21/08 34/168 |

OTHER PUBLICATIONS

Jun. 16, 2021 International Search Report issued in International Patent Application No. PCT/IB2021/051770.

Jun. 16, 2021 Written Opinion issued in International Patent Application No. PCT/IB2021/051770.

* cited by examiner

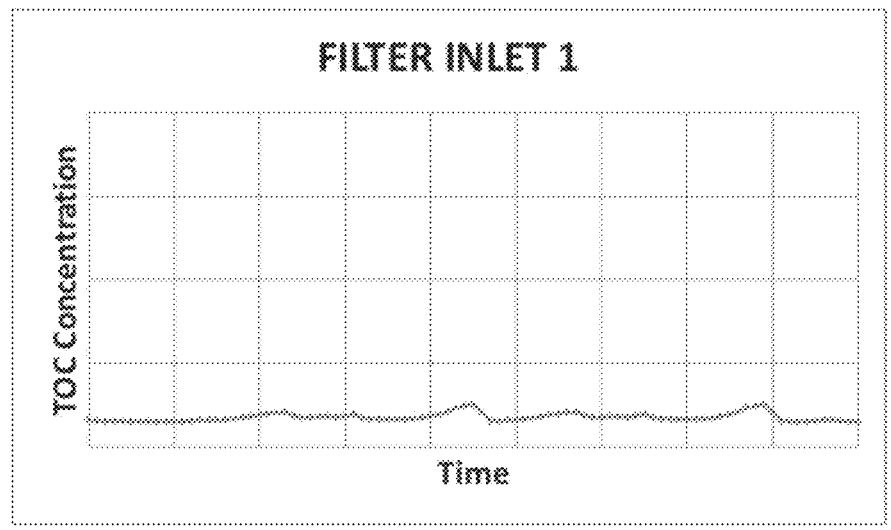
Low TOC inlet concentration
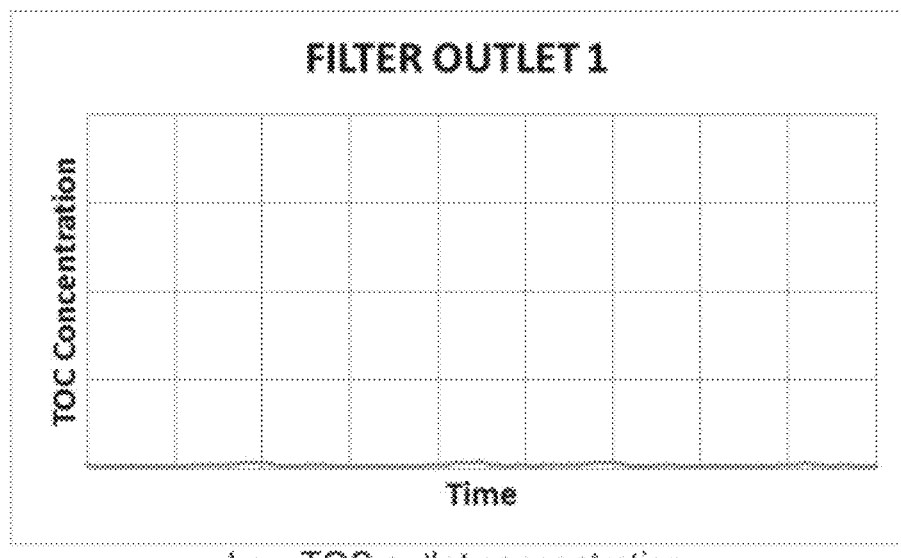
Low TOC outlet concentration
Fig. 3

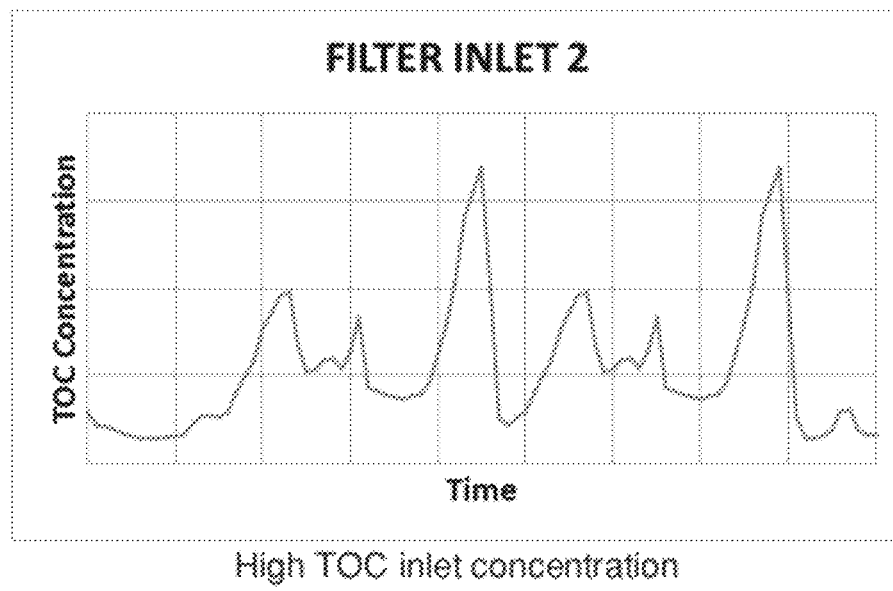
High TOC inlet concentration
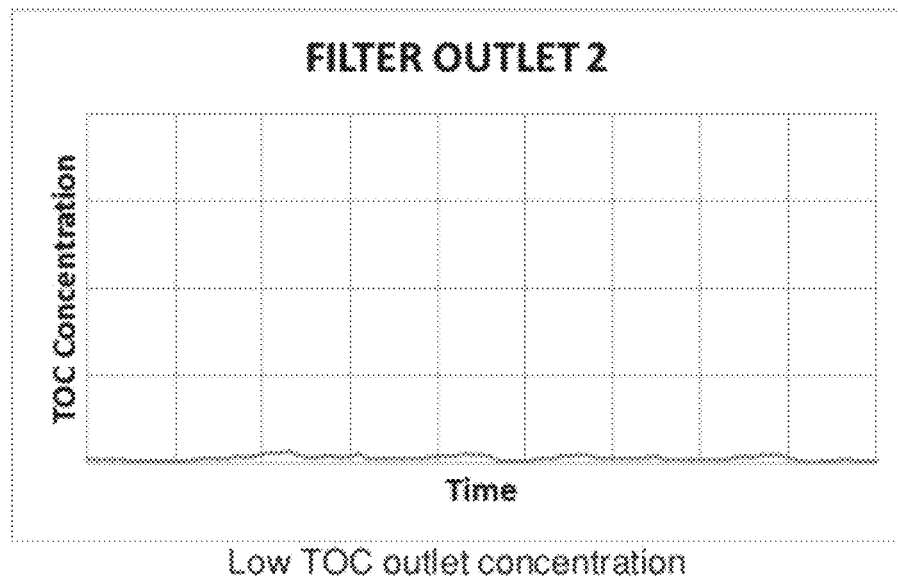
Low TOC outlet concentration
Fig. 4

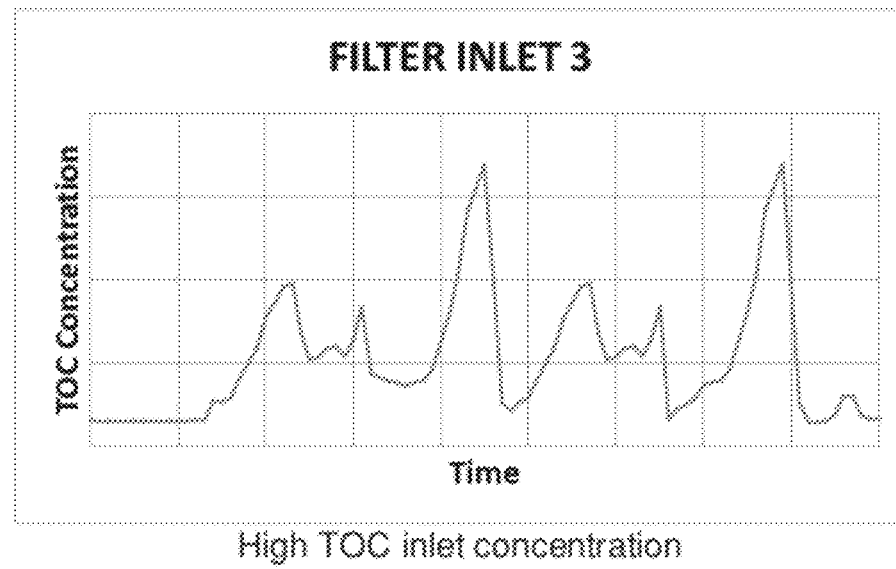
High TOC inlet concentration
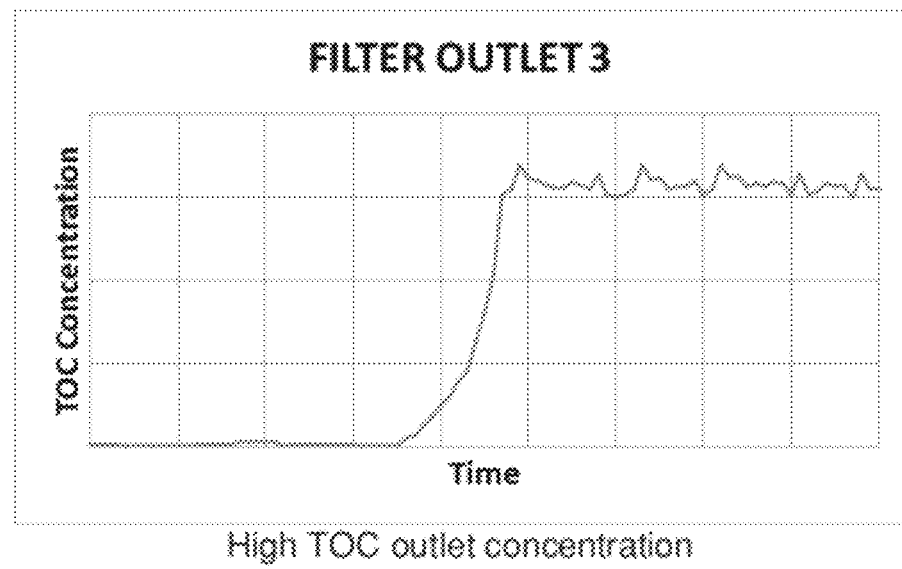
High TOC outlet concentration
Fig. 5

| Component | Molecular weight [g/mol] | N. Carbon atoms | Measured value [mgC/Nm3] | Dehumidification plant air flow rate [m3/h] |
|---|---|---|---|---|
| Methane Base | 16.04 | 1 | 0.91 | 1930 |
| Heavy HC (benzene) | 78.11 | 6 | 0.33 | 1930 |
| VOC (Line 16) | 44.05 | 2 | 1.92 | 1930 |
| VOC (Line 17) | 44.05 | 2 | 1.80 | 1930 |
| VOC (Line 19) | 44.05 | 2 | 0.33 | 1930 |

| Component | Component concentration [ppm] | Component concentration [mg/Nm3] | Component hourly concentration [mg/h] | Component concentration [g/h] |
|---|---|---|---|---|
| Methane Base | 1.70 | 1,216 | 2348 | 2.35 |
| Heavy HC (benzene) | 0.10 | 0.358 | 691 | 0.69 |
| VOC (Line 16) | 1.79 | 3,524 | 6801 | 6.80 |
| VOC (Line 17) | 1.79 | 3,524 | 6801 | 6.80 |
| VOC (Line 19) | 0.21 | 0.422 | 813 | 0.81 |

Fig. 10

SEPARATOR ANALYSIS METHOD AND APPARATUS

BACKGROUND OF THE INVENTION

The invention relates to a separator analysis and/or monitoring method and/or apparatus, in particular a separator used for a process gas in the context of treatment of plastics in incoherent state, i.e. in the form of granules and/or microgranules and/or powder and/or flakes or the like. The invention may be used in particular, to determine the operating condition of a separator like, for example, an absorption filtering medium and/or a condensation dehumidifier.

Specifically but not exclusively, the invention can be advantageously applied in the context of a plant for treating incoherent plastics, such as, for example, a dehumidifying and/or drying and/or crystallizing plant and/or plant for conveying plastics in a vacuum and/or under pressure. This treatment plant may be intended, in particular, to feed a user machine, such as, for example, a machine for processing and transforming plastics, in particular an extruder that supplies extruded plastics to an injection moulding and/or blow moulding and/or compression moulding apparatus.

It is known, in the sector of the treatment of plastics, to use a flow of a process gas that comes into direct contact with the plastics, for example for dehumidifying, drying, crystallizing, conveying, etc.

It is further known, for example in a dehumidifying plant, that the processed plastics release into the surrounding environment various contaminating substances, following heating by the process gas. These substances may comprise, for example, volatile organic compounds (known below as VOC for the sake of brevity) and/or volatile organic solvents (known below as VOS for the sake of brevity), comprising different chemical compounds formed by molecules provided with different functional groups, having different physical and chemical behaviours, in general characterized by a certain volatility.

These contaminating substances, which increasingly derive from recycled polymers, are called by the international scientific community by the acronym N.I.A.S. (Non-Intentionally Added Substances).

To give one example, merely illustratively, in the field of food packaging with PET granules, the N.I.A.S. come from the recycling process of the material (rPET). Benzene, toluene, and limonene are examples of VOCs. Aldehydes, ketones, esters, alcohols and nitroderivatives are examples of VOSs.

VOC/VOS emissions are becoming critical in the field of plastics moulding, in particular because of the use of increasingly large percentages of recycled material in addition to new material.

This is particularly felt in the sector of food packaging, where it is possible that VOCs/VOSs come into contact with the packaged product. Examples of food packaging are preforms for bottles for containing liquids and multilayered film for packaging foods. It is thus necessary to monitor and regulate the percentage of VOC/VOS present in packages.

Various separating (decontamination, condensation, absorption, etc) devices are currently known that are usable to retain the aforementioned substances. Nevertheless, various aspects of the prior art are improvable.

Firstly, it is desirable to determine the state of the separator directly in line in the system processing the material.

It is further desirable to monitor the state of the separator, in particular the actual level thereof of saturation and/or absorption and/or condensation, so as to provide a predictive analysis in view of future maintenance or replacement.

Another current limit is the ability to distinguish between VOCs/VOSs. For this purpose, it is known to conduct analyses by gas chromatography to identify the nature and quantity of the VOC/VOS, for example benzene. Nevertheless, this requires analysis laboratory instruments that are difficult to use in line in the process, significantly complex operating methods and criteria, and long response times (on a scale of hours or days) that are hardly reactive for continuous production processes, in addition to highly qualified staff or staff to be professionally trained.

SUMMARY OF THE INVENTION

One object of the invention is to remedy one or more of the aforesaid limits and drawbacks of the prior art.

One object is to determine and monitor the state of a separator in real time during the process that uses the separator.

One object is to provide a method and/or an apparatus for analyzing a separator that is used for treating a process gas that flows in a closed circuit in the context of a plant for processing incoherent plastics.

One advantage is to enable the actual degree of efficiency of a separator to be detected in real time, in a precise and reliable manner, in particular the state of saturation of an absorption filtering medium.

One advantage is to provide a suitable analysis method and/or apparatus to detect the condition of a separator such as, in particular, a filtering medium for gas or a condensation dehumidifier.

One advantage is to permit effective and reliable monitoring in real time of the degree of efficiency of absorption and/or clogging of an absorption filter, in particular an active carbon filter.

One advantage is to permit monitoring in real time of the operating state of a condensation dehumidifier of a process gas.

One advantage is to analyze and monitor in real time the degree of saturation and/or the current efficiency and/or deterioration over time of a separator that separates humidity and/or contaminating substances contained in a process gas.

One advantage is to perform an analysis in real time of the degree of efficiency of an absorption filter, for example a filter of the molecular sieve type, in relation to at least one chemical compound or group of compounds, in particular acetaldehyde and/or methane and/or total organic carbon.

One advantage is to make possible effective monitoring in real time of the operating state of dehumidification device, in particular of the absorption type, for example molecular sieve filtering filter, downstream of a filtration device and/or of a condensation device, in particular monitoring suitable for verifying clogging of the dehumidification device due to contaminating substances present in the process gas and not completely retained by the filtration device and/or by the condensation device.

One advantage is to devise a suitable analysis method and/or apparatus for detecting the condition and/or the state and/or the quality of the plastics during the processing thereof (dehumidification and/or drying and/or crystallization and/or conveying in a vacuum and/or under pressure etc).

Such objects and advantages, and still others, are achieved by a method and/or an apparatus according to one or more of the claims set out below.

In one embodiment, an apparatus for analyzing an absorption filtering medium, in particular configured to separate volatile organic substances in a process gas of a plant for dehumidifying polymer granules, comprises a generator of a flow of gas (for example a fan) through the filtering medium, an analysis instrument that determines the total concentration of the organic carbon in the gas, means for measuring the concentrations of the total organic carbon in the flow of gas upstream and downstream of the filtering medium, means for determining an operating condition (for example the saturation state and/or the absorbent capacity and/or deterioration over time) of the filtering medium on the basis of a comparison of the aforesaid measured concentrations.

BRIEF DESCRIPTION OF THE DRAWINGS

The invention can be better understood and implemented with reference to the attached drawings that illustrate non-limiting embodiments thereof, in which:

FIGS. 3, 4 and 5 show three examples of monitoring results of the condition of the filtration device performed in the plant of FIG. 2 by analyzing the concentrations of total organic carbon;

FIG. 10 is a table that shows, by way of example, the data of some measurements made in a treatment plant for treating incoherent plastics, in particular in the dehumidification plant of FIG. 8;

DETAILED DESCRIPTION

Figure 1:
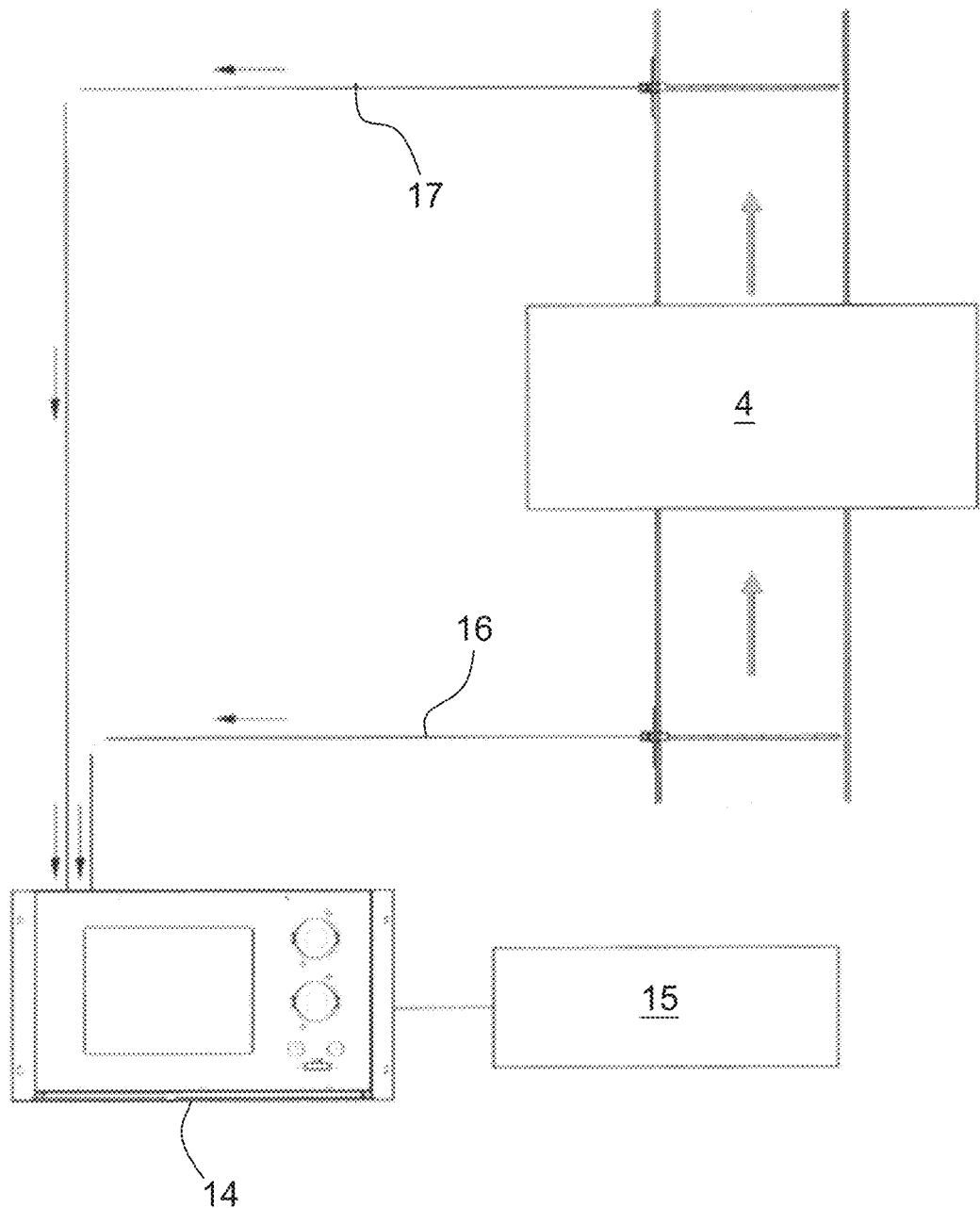
FIG. 1 shows, schematically, a first embodiment of an analysis apparatus in accordance with the present invention.
Figure 2:
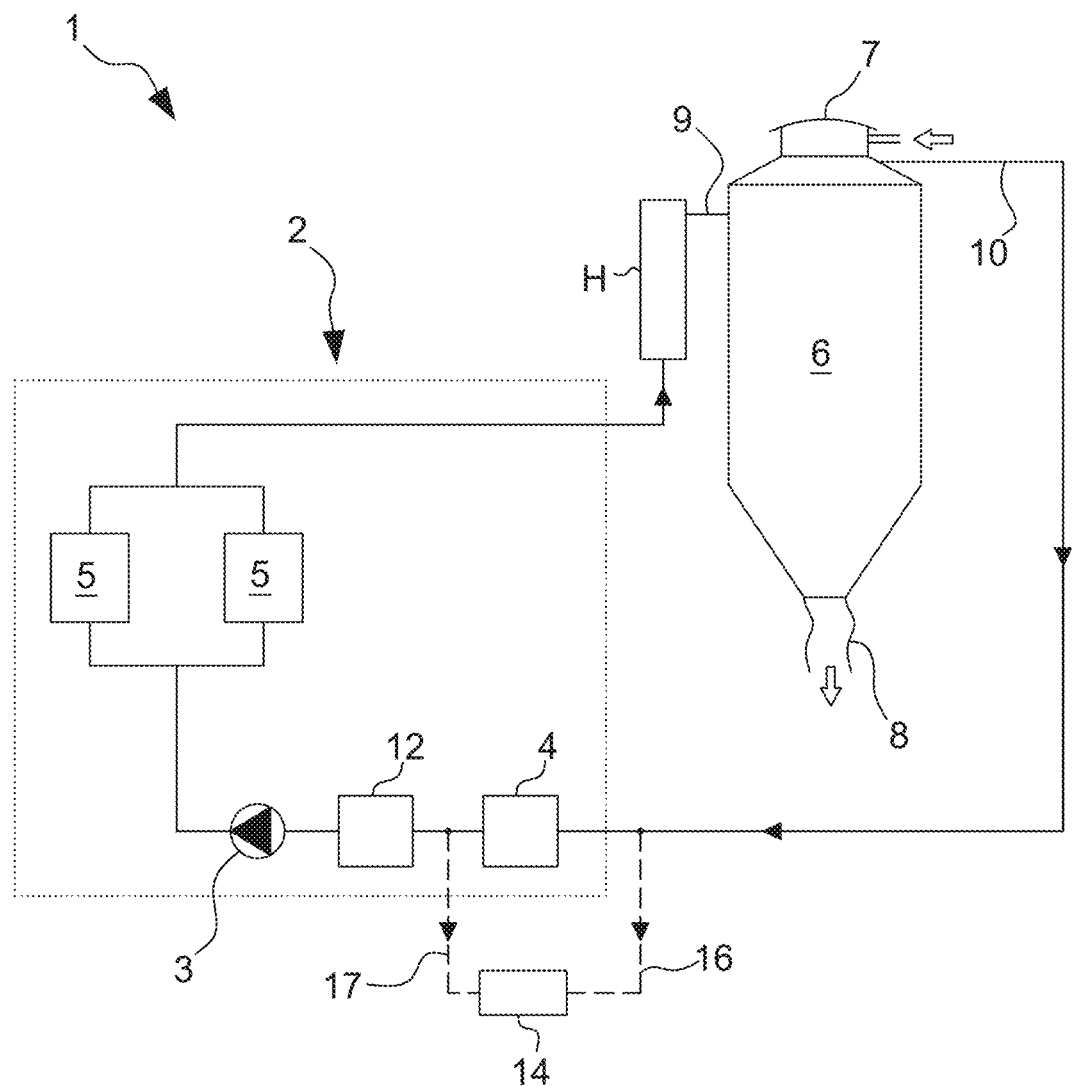
FIG. 2 shows a first embodiment of a dehumidifying plant that includes the analysis apparatus of FIG. 1.

With reference to the aforesaid figures, identical elements of different embodiments have been given the same numbering for simplicity and clarity.

A material dehumidifying plant for dehumidifying incoherent plastics has been numbered overall as 1. The material dehumidification plant 1 may comprise, in particular, a gas dehumidification plant 2 configured to dehumidify a process gas (air). The gas dehumidification plant 2 may comprise, in particular, at least one flow generator 3 configured to generate a flow of the process gas. The flow generator 3 may comprise, for example, at least one fan.

The gas dehumidification plant 2 may comprise, in particular, at least one filtration device 4 for filtering the process gas. The filtration device 4 may be, in particular, of the absorption type, for example of the active carbon type. The filtration device 4 may be configured, in particular, to retain contaminating substances, for example N.I.A.S., in particular VOC and/or VOS.

The gas dehumidification plant 2 may comprise, in particular, dehumidification device 5 comprising at least one dehumidification unit. The dehumidification device 5 may comprise, as in the specific embodiments, at least two dehumidification units placed parallel and controlled to alternate process steps and regeneration steps that are coordinated with one another. The dehumidification device 5 may be, as in this specific case, of the molecular sieve type. In particular, each of the two dehumidification units comprises at least one molecular sieve. Each dehumidification unit may comprise a molecular sieve tower.

The material dehumidification plant 1 may comprise, in particular, at least one container 6 (hopper) where dehumidification of the incoherent material occurs. The container 6 comprises at least one inlet 7 of the incoherent material and at least one outlet 8 of the incoherent material. The container 6 comprises at least one inlet 9 of the process gas that comes into contact with the incoherent material and at least one outlet 10 of the process gas. The material dehumidification plant 1 may comprise, in particular, at least one supply system 11 to supply the incoherent material to the inlet 7 of the container 6.

The gas dehumidification plant 2 may be configured, in particular, to dehumidify a process gas (for example air) and to supply the dehumidified process gas to the inlet 9 of the container 6. The gas dehumidification plant 2 may be configured, in particular, to receive and dehumidify the process gas used coming from the outlet 10 of the container 6. The gas dehumidification plant 2 may be configured, as in these embodiments, to operate in closed circuit. It is however possible, in other embodiments that are not shown, to use a dehumidification apparatus operating in an open circuit.

The filtration device 4 may comprise, in particular, at least one filtering medium to remove from the process gas suspended solid gas particles and the N.I.A.S. and/or TOC and/or VOC and/or VOS. The filtering medium may comprise, in particular, at least one (contaminated) inlet side and at least one (decontaminated) outlet side. The filtering medium may comprise, in particular, at least one filter of the active carbon type with flat or tapered or with another type of filter geometry.

The flow generator 3 is configured to generate a flow of gas through the filtering medium from the (contaminated) inlet side to the (decontaminated) outlet side. The flow generator 3 may be arranged, in particular, downstream of the filtering medium ("downstream" with reference to the direction of the flow of gas during filtration from the contaminated side to the decontaminated side). The flow generator 3 may be arranged, in particular, between the filtration device 4 and the dehumidification device 5.

The gas dehumidification plant 2 may comprise, in particular, a sensor configured to detect the pressure of the process gas at an outlet of the filtration device 4 and/or to detect the pressure drop of the process gas between the inlet and outlet of the filtration device 4.

The gas dehumidification plant 2 may comprise, in particular, at least one heat exchanger 12 arranged along the flow of process gas, in particular between the filtration device 4 and the dehumidification device 5. The heat exchanger 12 may be used to condition the process gas, in particular adjust the temperature of the process gas upstream of the dehumidification device 5.

Figure 7:
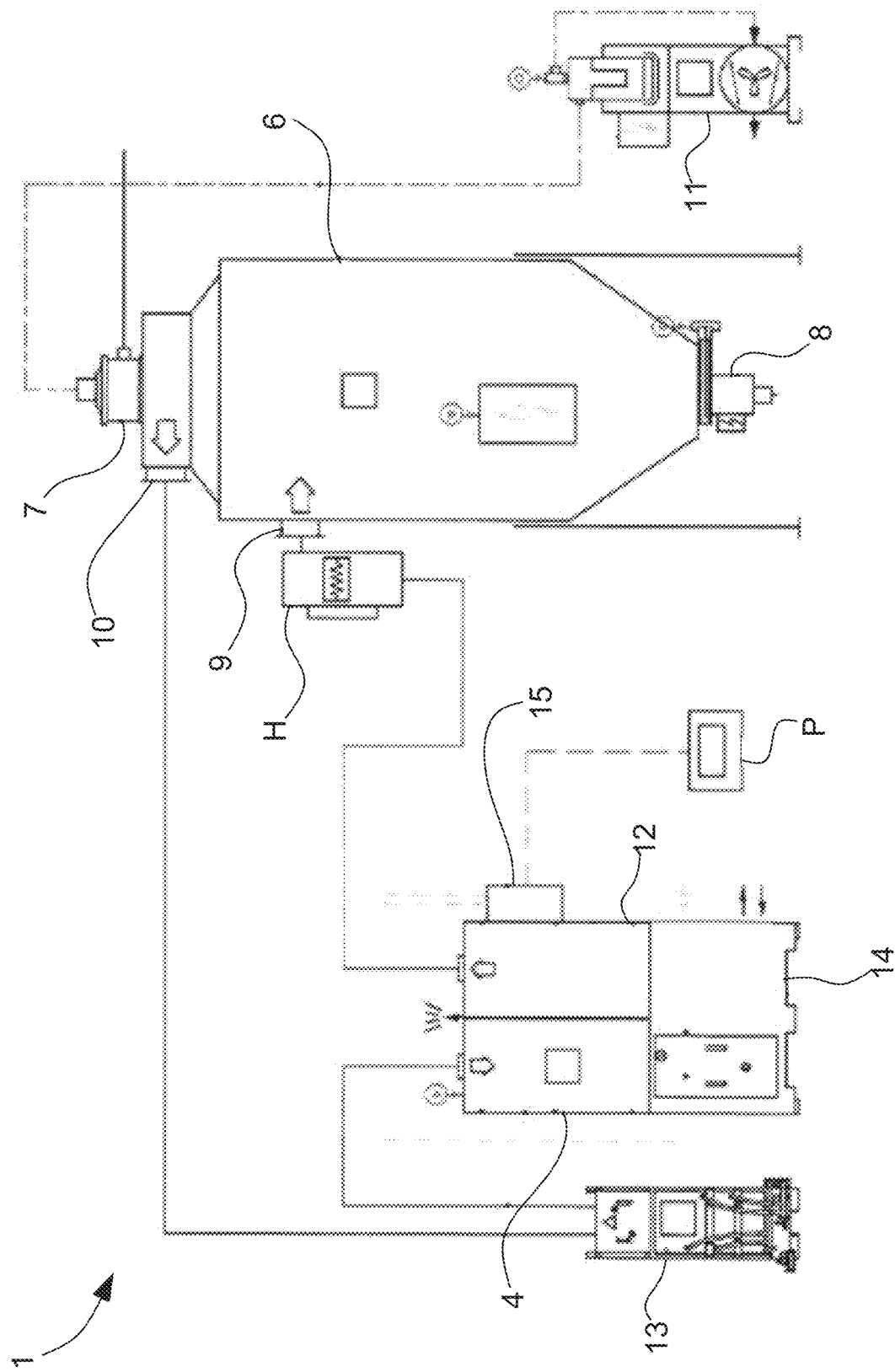
FIG. 7 shows a second embodiment of a dehumidifying plant that includes an analysis apparatus in accordance with the present invention, for example as in FIG. 1 or as in FIG. 6.
Figure 8:
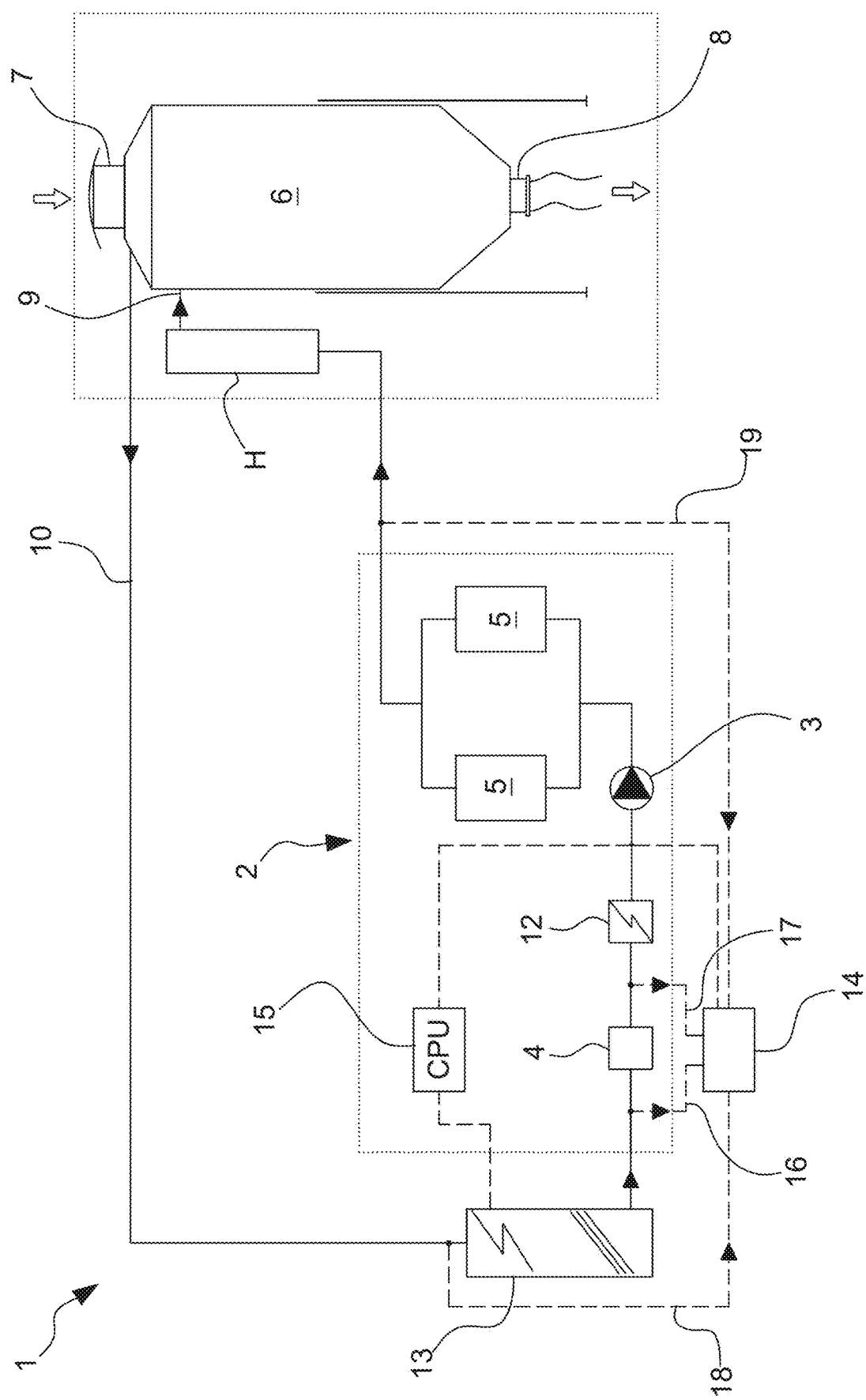
FIG. 8 shows a third embodiment of a dehumidifying plant that includes an analysis apparatus in accordance with the present invention, for example as in FIG. 1 or as in FIG. 6.

The material dehumidification plant 1 may comprise, as in the embodiments of FIGS. 7 and 8, at least one condensation unit 13 configured to dehumidify by condensation the process gas, in particular the gas coming from the outlet 8 of the container 6. The condensation unit 13 may comprise, in particular, at least one filter for retaining suspended powder material in the process gas and at least one condenser for separating the humidity from the process gas. The condensation unit 13 is arranged for delivering the process gas (at least partially decontaminated and/or dehumidified) to the filtration device 4.

The material dehumidification plant 1 may comprise, in particular, at least one analysis apparatus for monitoring the operating state of one or more of the various separators used in the plant to treat (filter, decontaminate, condense, etc) the process gas. Such separators may comprise, as in these embodiments, the filtration device 4, the dehumidification device 5 and the gas condensation unit 13. The analysis apparatus may comprise, in particular, at least one analysis instrument 14 configured to perform the analysis in question.

The material dehumidification plant 1 may comprise, in particular, at least one control unit 15, or central processing unit for controlling the plant, for example a programmable electronic unit (in particular with PLC and/or PC and/or microprocessor, etc), connected to the analysis instrument 14.

The material dehumidification plant 1 may comprise, in particular, at least one heater H arranged for heating the process gas before entering the container 6 through the gas inlet 9. The material dehumidification plant 1 may comprise, in particular, at least one user interface P for the interaction of a user with the control unit 15.

The analysis apparatus may comprise, in particular, at least one filter inlet sampling line 16 arranged for taking at least one sample of the process gas before the filtration device 4 (in particular after the gas condensation unit 13 if present and/or at or near an inlet of the filtration device 4) and for delivering this gas sample to the analysis instrument 14. The filter inlet 16 sampling line may be, in particular, provided with heating means (hot line) to avoid condensation phenomena.

The analysis instrument 14 may be used, in particular, also as a single analysis instrument configured so as to control two or more dehumidification plants simultaneously.

The analysis apparatus may comprise, in particular, at least one filter outlet 17 sampling line arranged for taking at least one sample of the process gas after the filtration device 4 (in particular before the heat exchanger 12 if present and/or before the dehumidification device 5 and/or at or near an outlet of the filtration device 4) and for delivering this gas sample to the analysis instrument 14. The filter outlet 17 sampling line may be, in particular, devoid of heating means (cold line).

The analysis apparatus may comprise, in particular, at least one condenser 18 sampling line arranged for taking at least one sample of the process gas before the gas condensation unit 13 (at or near an inlet of the gas condensation unit 13) and for delivering this gas sample to the analysis instrument 14. The condenser 18 sampling line may be, in particular, provided with heating means (hot line) to avoid condensation phenomena.

The analysis apparatus may comprise, in particular, at least one dehumidifier sampling line 19 arranged for taking at least one sample of the process gas after the dehumidification device 5 (at or near an outlet of the dehumidification device 5) and for delivering the sample to the analysis instrument 14. The dehumidifier sampling line 19 may be, in particular, provided with heating means (hot line) to avoid condensation phenomena.

Each of the sampling lines 16, 17, 18 and 19 may be provided with heating means to avoid condensation phenomena, in particular in the presence of high concentrations of contaminants. In particular, it has been found that, for each sampling line 16, 17, 18 and 19, for line temperature values above 400° C., there are no condensation phenomena.

Each of the sampling lines 16, 17, 18 and 19 may comprise at least one sampling end arranged to sample at least one gas sample to be analyzed (sampling point). In particular, the sampling line 18 (if present) may be positioned with the sampling point at the inlet or near the inlet of the condenser, in particular as a single heated line, which is usable in particular to perform a product quality check during the processing step. In particular, the sampling lines 16 and 17 are positioned with the sampling points respectively at the inlet and the outlet (or near the inlet and the outlet) of the active carbon filtering system, as two cold or non-heated lines, which are usable in particular for performing a check of the state of the active carbon filtering medium. The sampling line 19 may be positioned with the sampling point at the outlet, or near the outlet, or after the absorbing system (for example of the molecular sieve type), as a cold or non-heated line, which is usable in particular to perform a check of the state of the absorbing system.

The analysis instrument 14 may comprise, in particular, a gas chromatographic analysis instrument (in particular a multiline process gas chromatographic analyzer). The analysis instrument 14 may comprise, in particular, an analysis instrument configured to measure the concentration of at least one contaminant in a gas, where by contaminant we can mean, in particular, at least one volatile organic compound VOC and/or at least one volatile organic solvent VOS and/or at least one NIAS (Non-Intentionally Added Substance). The analysis instrument 14 may comprise, by way of merely illustrative and non-limiting example, a flame ionization detector (FID).

The analysis instrument 14 may comprise, according to other embodiments, an analysis instrument of another type like for example a thermal conductivity detector (TCD), or a gas detector of optical (for example infrared) type, or a catalytic gas sensor or a semiconductor gas detector, or a gas detector of yet another type.

Figure 6:
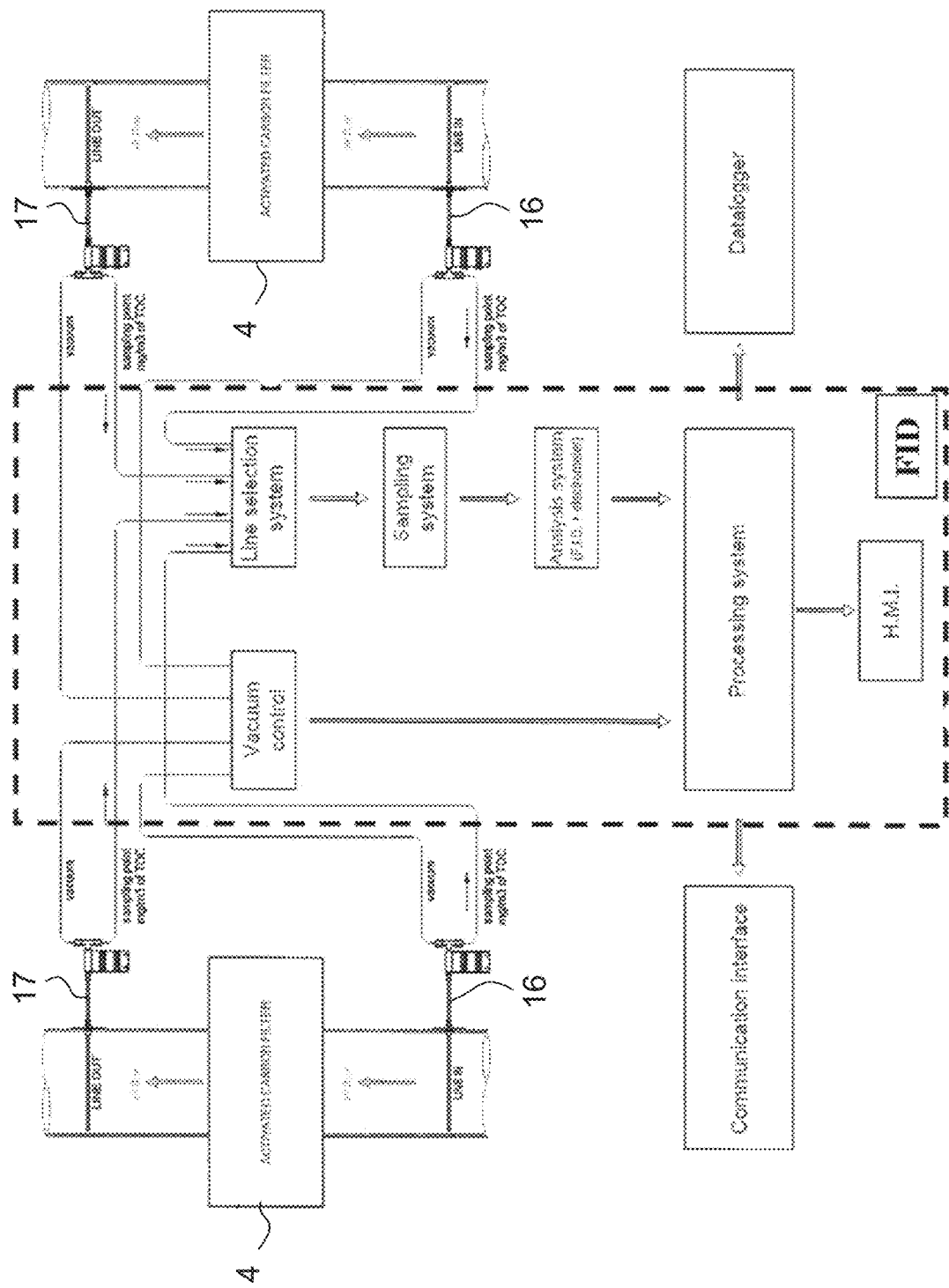
FIG. 6 shows, schematically, a second embodiment of an analysis apparatus in accordance with the present invention.

FIG. 6 shows a diagram of one embodiment, merely illustratively and not in a limiting manner, of an analysis instrument 14 (flame ionization detector, or FID) which is usable in accordance with the invention. The analysis instrument 14 (in FIG. 6 is the part contained within the dashed lines) is configured, in particular, to analyze the total organic carbon (TOC). The analysis instrument 14 may be configured, as in the embodiment of FIG. 6, to monitor two distinct separators. The analysis instrument 14 comprises in this case two reading channels, each of which comprises a tube configured to convey the sample of process gas to be analyzed that is taken before and after the respective separator.

The analysis instrument 14 (for example, as said, of the type used for analyzing fumes) is provided with scrubbing means (in particular of known type) to scrub the reading channel at the end of each sampling. The analysis instrument 14 may be configured, in particular, to carry out readings with periodic sampling, for example at a set and programmable time cadence (for example at a cadence of the order of few tens of seconds).

The analysis instrument 14 may be connected, in particular, to at least two sampling and analysis lines of the separator, i.e. a sampling line to analyze the process gas entering the separator to be monitored and the other sampling line to analyze the process gas exiting the separator.

The analysis instrument 14 (by gas chromatography) may be configured, in particular, to distinguish the presence of the acetaldehyde and/or of the methane with respect to the possible presence of other contaminating hydrocarbons.

It has been found in experiments that a used separator, in particular an absorption filtering medium, for example comprising active carbons, can contain not insignificant quantities of acetaldehyde. This involves the risk that, when analyzing the results of a gas chromatographic analysis of the filtered gas exiting the separator, the acetaldehyde may cover the other hydrocarbons present in the same analysis peak, greatly limiting the efficacy and reliability of the analysis of the current efficiency of the separator. This invention enables this drawback to be overcome.

The analysis method may comprise, in particular, the step of taking at least one sample of process gas from a sampling point situated at or near an inlet of a separator (filtration device 4, dehumidification device 5, gas condensation unit 13) and of conveying the gas sample to the analysis instrument 14 of the concentration of total organic carbon.

The analysis method may comprise, in particular, the step of taking at least one sample of process gas from a sampling point situated at or near an outlet of the aforesaid separator (filtration device 4, dehumidification device 5, gas condensation unit 13) and of conveying the gas sample to the analysis apparatus 14 of the concentration of total organic carbon.

The analysis method may comprise, in particular, the step of determining the concentrations of methane, both in the gas sample at the inlet and in the gas sample at the outlet. The analysis method may comprise, in particular, the step of determining the concentrations of acetaldehyde, both in the gas sample at the inlet and in the gas sample at the outlet. The analysis method may comprise, in particular, the step of determining the concentrations of total organic carbon (TOC), both in the gas sample at the inlet and in the gas sample at the outlet. The analysis method may comprise, in particular, the step of determining the concentrations of total organic carbon less the concentrations of acetaldehyde and/or less the concentrations of methane, both in the gas sample at the inlet and in the gas sample at the outlet.

The analysis method may comprise, in particular, the step of comparing at least one concentration measured in the gas sample at the inlet with at least one concentration measured in the gas sample at the outlet. In this comparison step it is possible to compare together two concentrations of methane at the inlet and at the outlet, i.e. one concentration of the gas sample before the separator and the other of the gas sample after the separator. In this comparison step, it is possible to compare together two concentrations of acetaldehyde at the inlet and at the outlet. In this comparison step it is possible to compare together two concentrations of the total organic carbon at the inlet and at the outlet. In this comparison step it is possible to compare together two concentrations, at the inlet and at the outlet, of the total organic carbon without methane and/or without acetaldehyde.

The separator, to which the aforesaid analysis method steps are applied, may comprise, in particular, the filtration device 4. In other embodiments, the separator, to which the aforesaid analysis method steps are applied, may comprise the dehumidification device 5. In other embodiments, the separator, to which the aforesaid analysis method steps are applied, may comprise the gas condensation unit 13.

The analysis method may comprise, in particular, the step of taking at least one sample of process gas to be condensed from a sampling point situated at or near an inlet of the gas condensation unit 13 and of conveying the sample of the gas to be condensed to the analysis instrument 14.

The analysis method may comprise, in particular, the step of taking at least one sample of dehumidified process gas from a sampling point situated at or near an outlet of the dehumidification device 5 and of conveying the dehumidified gas sample to the analysis instrument 14.

The analysis method may comprise, in particular, the step of comparing at least one concentration measured in the gas sample to be condensed (i.e. sampled before the gas condensation unit 13) with at least one concentration measured in the dehumidified gas sample (i.e. sampled after the dehumidification device 5). In this comparison step it is possible to compare together two measured concentrations of methane at the inlet and at the outlet, i.e., respectively, one a concentration of the gas sample to be condensed and the other a concentration of the dehumidified gas sample. In this comparison step it is possible to compare together two measured concentrations of acetaldehyde at the inlet and at the outlet (respectively, gas to be condensed and dehumidified gas). In this comparison step it is possible to compare together two measured concentrations of the total organic carbon at the inlet and at the outlet (respectively, gas to be condensed and dehumidified gas). In this comparison step it is possible to compare together two calculated concentrations, at the inlet and at the outlet (respectively, gas to be condensed and dehumidified gas), of the total organic carbon without methane and/or without acetaldehyde.

The analysis method may comprise, in particular, the step of taking at least one sample of wet process gas from a sampling point situated at or near the outlet 10 of the container 6 and of conveying the sample of the wet process gas to the analysis instrument 14.

The analysis method may comprise, in particular, the step of taking at least one dehumidified gas sample from a sampling point situated at or near the inlet 9 of the container 6 and of conveying the dehumidified gas sample to the analysis instrument 14.

The analysis method may comprise, in particular, the step of comparing at least one concentration measured in the wet gas sample (i.e. sample taken after the outlet 10) with at least one concentration measured in the dehumidified gas sample (i.e. sample taken before the inlet 9). In this comparison step it is possible to compare together two measured concentrations of methane at the outlet and at the inlet of the container 6, i.e. one concentration of the wet gas sample at the outlet and the other concentration of the dehumidified gas sample at the inlet. In this comparison step, it is possible to compare together two measured concentrations of acetaldehyde at the outlet and inlet of the container 6 (wet gas at the outlet and dehumidified gas at the inlet). In this comparison step, it is possible to compare together two measured concentrations of the total organic carbon at the outlet and inlet of the container 6 (wet gas at the outlet and dehumidified gas at the inlet). In this comparison step, it is possible to compare together two calculated concentrations, at the outlet and inlet of the container 6 (wet gas at the outlet and dehumidified gas at the inlet), of the total organic carbon without methane and/or without acetaldehyde.

During normal operation of the material dehumidification plant 1, the filtration device 4 (for example absorption filtration device) retains the contaminants, so that the measured or calculated concentration (for example the concentration of TOC) at the inlet of the filtration device 4 has a higher value than the concentration (for example of TOC) at the outlet. The concentration may be, for example, expressed in $mg/m^3$ and/or in parts per million (ppm) and/or in parts per billion (ppb).

When the filtration device 4 reaches saturation, it is no longer capable of retaining the contaminants and thus the concentration (for example of TOC) at the outlet of the filtration device 4 increases until it reaches a level equal to or similar to the level of the concentration at the inlet.

For example, if the analysis instrument 14 detects a concentration of TOC at the inlet of the filtering medium of about 100 ppm and at the outlet from the same filtering medium a value equal to about 100 ppm, it is deduced that the filtering medium is saturated (in particular it is no longer absorbing).

In FIGS. 3, 4 and 5, three embodiments are shown, which must be deemed to be indicative and non-limiting, of the values measured over time of the concentrations of TOC at the inlet and at the outlet of the filtration device 4.

In FIG. 3, the comparison can be seen between the inlet and outlet relating to an absorption filtering medium with high absorption capacity, in which the value of the concentration of TOC at the inlet is relatively low, which can occur, for example, in the production of preforms, where the percentage of recycled plastics granules (r-PET) with respect to the virgin material is very low (for example lower than 10%). In this embodiment the filtering medium is to be deemed to be efficient, without the need for maintenance.

In FIG. 4, the value of the concentration of TOC at the inlet is relatively high and it can be observed from the comparison that the filtering medium has a high absorption capacity. The embodiment of FIG. 4 is representative of the case of production of preforms where the percentage of recycled plastics granules (r-PET) with respect to the virgin material is relatively high (for example between 40% and 70%). Also in this embodiment, the filter is to be deemed to be efficient, without the need for maintenance.

In FIG. 5, it is seen that the value of the concentration of TOC at the inlet is relatively high and that, from a certain moment, also the value of the concentration of TOC at the outlet is relatively high. This indicates that the filtering medium is to be deemed saturated and has to be replaced or maintained.

The comparison of the concentrations (for example of TOC) between the inlet and outlet thus provides information on the operating state of the filtering medium and is indicative of whether the filtering medium requires maintenance and/or replacement.

Figure 9:
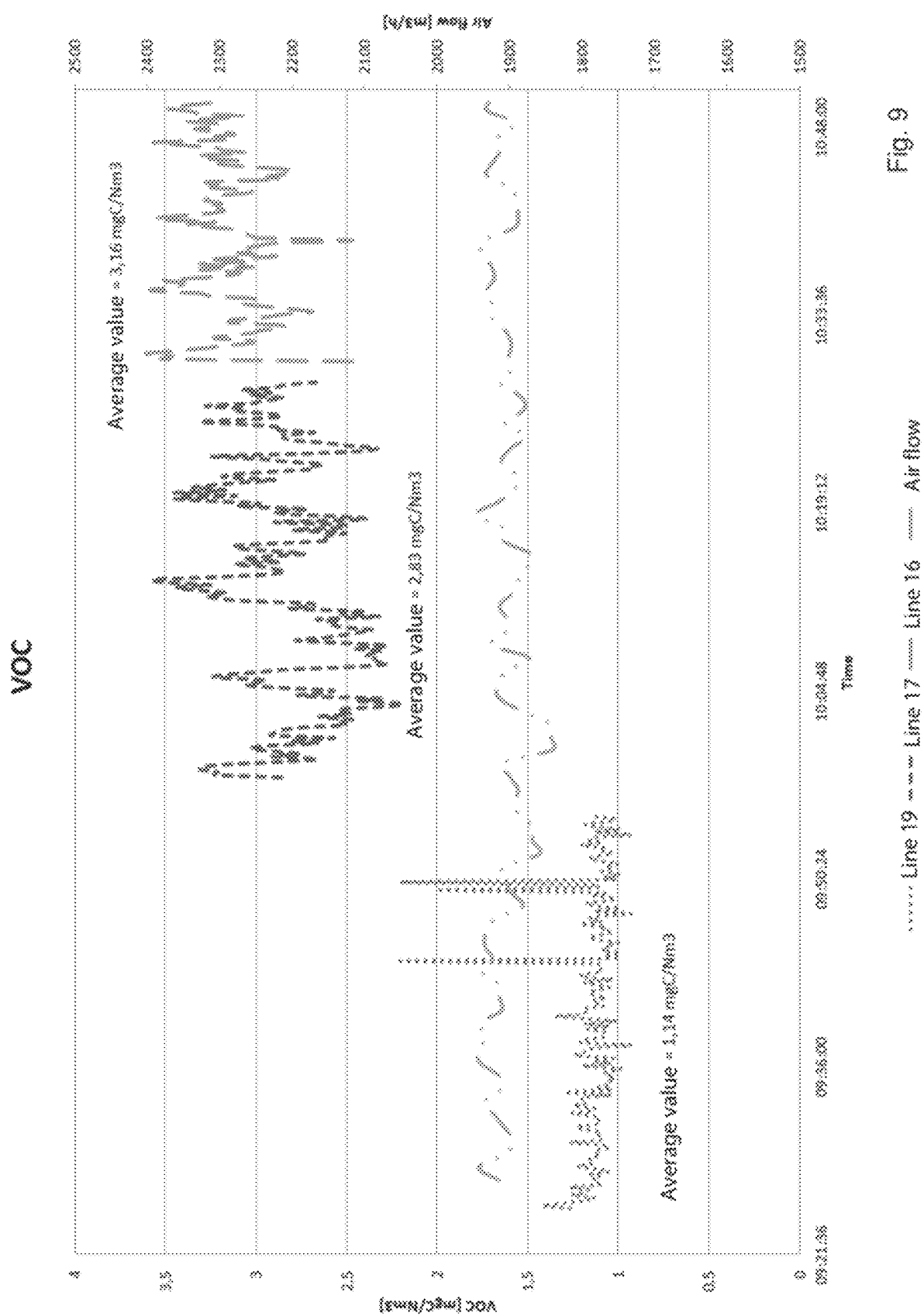
FIG. 9 is a graph by way of example of VOC values measured in three different sampling zones of a treatment plant for treating incoherent plastics, in particular of the dehumidification plant of FIG. 8.

FIG. 9 shows, by way of example, the values of the concentrations of VOC measured over time in samples taken from three different sampling points of the plant of FIG. 8, i.e. taken from lines 16, 17 and 19. The graph of FIG. 9 also shows the values of the airflow processed by the dehumidification plant.

FIG. 9 further shows the average value of the values of the concentrations of VOC read by the line 16, which is placed at the inlet of the absorbent medium, and the average value of the values of the concentrations of VOC read by the line 17, which is placed at the outlet of the absorbent medium. The difference between the average value of the concentrations of VOC of the line 16 and the average value of the concentrations of VOC of the line 17 may be used as an indication of the absorption capacity of the absorbent medium.

FIG. 9 further shows the average value of the values of the concentrations of VOC read by the line 19 placed at the outlet of the dehumidification device. The difference between the average value of the concentrations of VOC of the line 17 and the average value of the concentrations of VOC of the line 19 may be used as an indication of the quantity and/or of the concentration of acetaldehyde contained in the process gas.

It is also possible to determine (in particular with reference to FIG. 9) the difference between the average value of the concentrations of VOC of the line 16 (inlet absorbent medium) and the average value of the concentrations of VOC of the line 19 (dehumidification device outlet), in which this difference may be used as an indication of the quantity or concentration of the contaminating residue. In the specific embodiment shown in FIG. 9, purely indicatively, it is possible to obtain the following information:

quantity of contaminants retained=2.02 $mgC/Nm^3$;
quantity of contaminants not retained but left circulating=1.14 $mgC/Nm^3$.

The table of FIG. 10 shows, by way of example, the data detected by tests conducted in a dehumidifying plant of rPET, with clear presence of acetaldehyde. The quantity of certain single substances may be determined by differences in the values shown in FIG. 10. For each measured concentration value, the absolute values and the relative values are shown associated with the actual flowrate of the process gas (determined by the dehumidification plant and expressed in $m_3/kg$).

In FIG. 10, the methane base may be considered to be the concentration value at the outlet from the dehumidification device of the plant, equal to 0.91 $mgC/Nm^3$, corresponding to 1.7 ppm of methane (value very near typical average environmental value). In the case under examination, the filtering medium is made with active carbon, so that it can be considered, in particular, that the retained compounds substantially consist of benzene. The rest of the compounds, which are not retained, can be considered, in particular, to consist substantially of acetaldehyde.

It is seen that it is not necessary to identify, in the gas samples taken, the concentrations of all the hydrocarbons absorbed by the filtering medium. It is still possible to determine, in the gas samples taken, the concentrations of acetaldehyde and/or of methane. The analysis instrument 14 may perform a gas chromatographic analysis that is able to distinguish the methane and the acetaldehyde from all the other TOC contaminants present in the process gas. It is thus possible to compare the concentrations of these other TOC contaminants at the inlet and at the outlet of the filtering medium. It is also possible to compare, between the inlet and outlet of the filtering medium, concentrations of methane, concentrations of acetaldehyde, and concentrations of total TOC.

The analysis method in question provides an almost immediate response, in real time, which enables the plant to be monitored and the operators assigned to routine and/or special maintenance to be informed of the actual degree of saturation of the separators and of the current quality of the process gas. It has been found in experiments that the response times obtainable with the analysis method in question are significantly reduced, for example by the order of tens of seconds.

It is further possible to monitor the saturation state of the filtering medium by analyzing the concentration values (for example of TOC) measured over time to determine in advance when there will be the next maintenance task, in particular on the basis of the greater or lesser variation of the concentration over the unit of time. If, for example, the variation of the concentrations of TOC measured downstream of the separator in a certain period of time ΔT is high, the time envisaged for performing the task will be low, whereas on the other hand if the variation of the concentrations of TOC measured downstream of the separator in the period ΔT is reduced, the envisaged for performing the maintenance task will be high. It is in particular possible to envisage when the concentration downstream of the separator will reach a set value on the basis of the concentrations measured over time downstream of the separator.

Detecting the concentrations of TOC (and/or of methane and/or of acetaldehyde) at the outlet 8 of the container 6 (and/or at the inlet of the filtration device 4 and/or at the inlet of the gas condensation unit 13) enables the quality of the polymer to be determined whilst the latter is being processed, as, for example, a high concentration of TOC in the process gas will be indicative of a high concentration of contaminants and thus of poor quality of the processed polymer.

Owing to the invention, a user can intervene to modify one or more process parameters to adjust the process of processing the material on the basis of the results of the analysis of the process gas performed in real time. It is possible, for example, block the productive process, or modify the percentage of recycled material (for example r-PET) with respect to the virgin material, or increase the flow of the process fluid, or raise the temperature of the dehumidification and/or drying gas, or reduce the hourly production of the processed material, etc.

Owing to the invention, it is possible to perform a line quality check in order to detect the quality of the material being processed, enabling preventive tasks to be performed on the processing process to obtain a quality product, making the processing process substantially automatic.

The analysis method in question could be applied not only to a transformation plant that processes the plastics granules to obtain a finished product, but also in a plant for producing recycled plastics granules, in which the recycling process involves using a flow of air to heat and dry the recycled plastics before the latter enters a device (extruder) that is suitable for transforming the recycled plastics into plastics granules.

Figure 11:
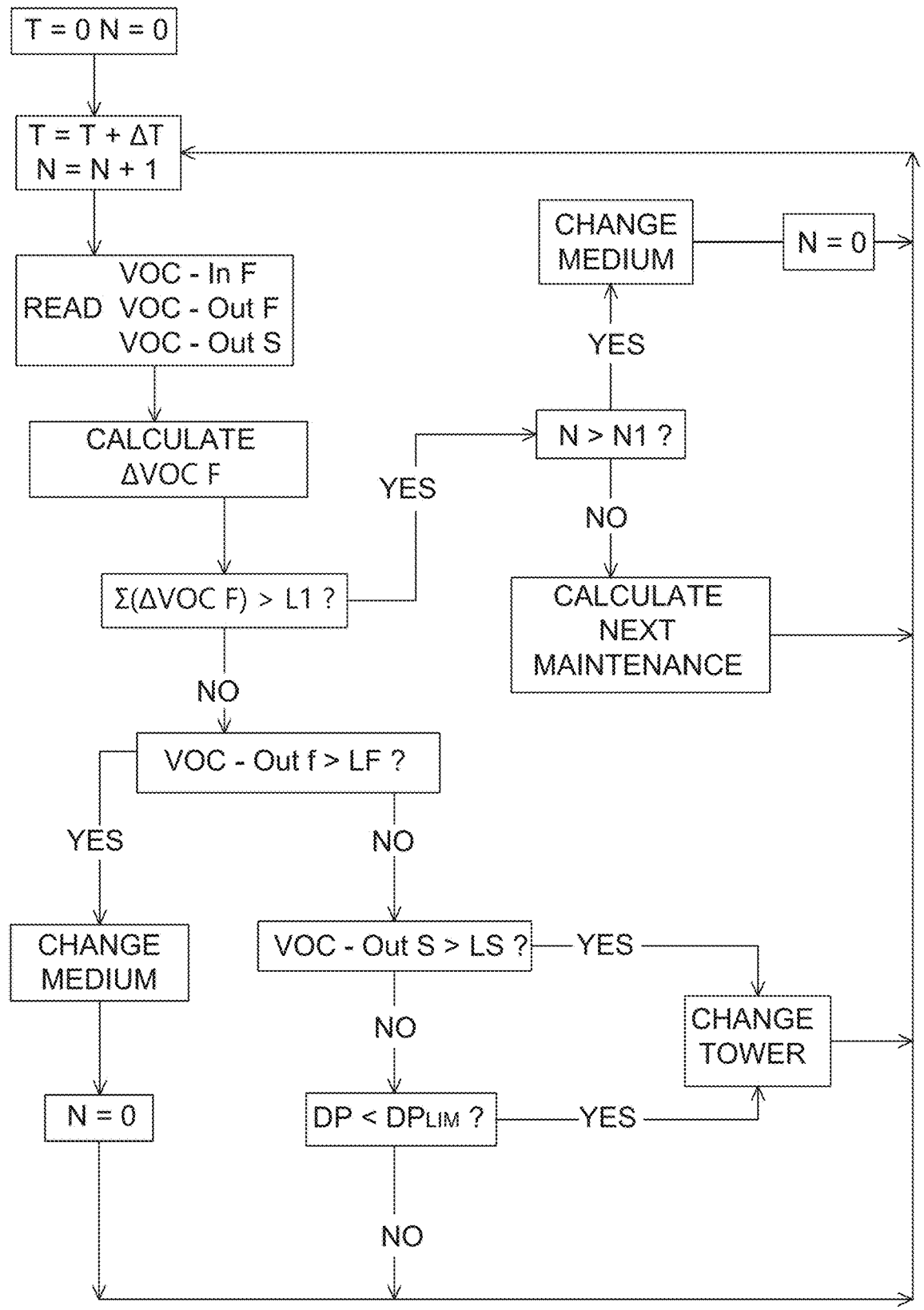
FIG. 11 is a flow diagram showing one embodiment of an analysis method in accordance with the present invention.

In FIG. 11, an embodiment is shown of an algorithm for analyzing and monitoring the filtering medium. The symbols in FIG. 11 have the following meanings:

T=time counter;
N=number of cycles of iterative algorithm;
VOC-InF=VOC concentration measured in line 16 (upstream of the absorbent medium);
VOC-OutF=VOC concentration measured in line 17 (downstream of the absorbent medium);
VOC-OutS=VOC concentration measured in line 19 (downstream of the dehumidification device);
ΔVOC F=difference between VOC-InF and VOC-OutF (VOC concentrations before and after the absorbent medium) for each cycle of the iterative algorithm;
L1=set accumulation limit value of the absorbent medium;
LF=set absorption limit value of the absorbent medium;
LS=saturation limit value of the dehumidification device;
N1=limit value of the maximum number of cycles for which it is possible to exceed L1;
DP=dew point value measured at the outlet of the dehumidification device;
$DP_{LIM}$=limit value of the dew point on the basis of which to activate the reversal between the process step and the regeneration step for the two dehumidification units (towers) of the dehumidification device arranged parallel.

At each cycle, the algorithm determines the concentrations of VOC in lines 16, 17 and 19, calculates the ΔVOC F difference (and possibly also the difference between VOC-OutF and VOC-OutS) and calculates the sum of the various differences ΔVOC F calculated in all the cycles from the start of the procedure. After which, it makes comparisons with the preset limit values and, on the basis of these comparisons, can proceed to the subsequent cycle without intervening or reporting anything, or can issue an alarm to alert to the need to replace the absorbent medium, or can issue an indication of the time envisaged for the next maintenance work on the absorbent medium, or can issue a signal for controlling the tower change, i.e. the alternating process/regeneration reversal for the two dehumidification units (towers) of the dehumidification device.

The algorithm enables the need to be established for regeneration of a dehumidification unit on the basis of the measured concentration level of the contaminants absorbed by the medium (molecular sieve) of the dehumidification unit, in particular when the measured value VOC-OutS exceeds the limit value LS. Further, the algorithm enables the need to be established for regeneration of a dehumidification unit on the basis of the humidification condition of the medium (molecular sieve), in particular when the measured value DP exceeds the limit value $DP_{LIM}$.

Each of the limit values LF, LS, L1, N1, $DP_{LIM}$ may be set on the basis of need and may be resettable.

The invention claimed is:

1. A method of analysis, comprising the steps of:
generating a gas flow through a separator from an inlet side to an outlet side of said separator, said gas comprising a process gas which has processed incoherent plastics;
detecting a concentration of at least one contaminant in the gas in said inlet side and a concentration of said at least one contaminant in the gas in said outlet side; and
determining at least one operating condition of said separator on the basis of said detected concentrations;
wherein said step of determining at least one operating condition comprises predicting when the concentration in said outlet side will reach a predetermined value based on the concentrations detected over time in said outlet side.

2. The method according to claim 1, wherein said step of detecting a concentration comprises detecting a concentration of total organic carbon.

3. The method according to claim 1, wherein said step of detecting a concentration comprises detecting a concentration of total organic carbon without acetaldehyde.

4. The method according to claim 1, wherein said step of detecting a concentration comprises detecting a concentration of total organic carbon without methane.

5. The method according to claim 1, wherein said step of detecting a concentration comprises detecting a concentration of acetaldehyde.

6. The method according to claim 1, wherein said step of detecting a concentration comprises detecting a concentration of methane.

7. A method of analysis, comprising the steps of:
generating a gas flow through a separator from an inlet side to an outlet side of said separator, said gas comprising a process gas which has processed incoherent plastics;

detecting a concentration of total organic carbon, or total organic carbon without acetaldehyde, or total organic carbon without methane, or acetaldehyde, or methane, in the gas in said inlet side and/or in said outlet side; and determining at least one operating condition of said separator on the basis of the concentration detected in said outlet side and/or determining at least one operating condition of said gas flow on the basis of the concentration detected in said inlet side.

8. The method according to claim 7, wherein said step of determining at least one operating condition comprises predicting when the concentration in said outlet side will reach a predetermined value based on the concentrations detected over time in said outlet side.

9. The method according to claim 7, wherein said gas flow in said outlet side is sent as a process gas for processing incoherent plastics.

10. The method according to claim 7, wherein said separator comprises at least one filtration device with at least one absorption filter medium, wherein said absorption filter medium comprises an active carbon filter medium.

11. The method according to claim 7, wherein said separator comprises a molecular sieve dehumidification device.

12. The method according to claim 7, wherein said separator comprises at least one gas condensing unit.

13. The method according to claim 7, wherein said separator is configured to filter one or more volatile organic compounds (VOC), including benzene, toluene, limonene, and/or to filter one or more volatile organic solvents (VOS), including aldehydes, ketones, esters, alcohols, nitroderivatives.

14. The method according to claim 7, wherein said step of determining at least one operating condition comprises comparing the concentrations in said inlet side and in said outlet side with each other.

15. The method according to claim 7, wherein said separator comprises at least one gas condensing unit, at least one absorption filtration device and at least one dehumidification device.

16. The method according to claim 7, comprising the steps of introducing incoherent plastics to be processed into a container, extracting the processed material from said container, introducing a process gas into said container to process said material and extracting the used process gas from said container, said gas flow in said inlet side comprising said used process gas and said gas flow in said outlet side being sent as process gas into said container.

17. A method of analysis, comprising the steps of:
generating a gas flow through a separator from an inlet side to an outlet side of said separator, said gas comprising a process gas which has processed incoherent plastics;

detecting a concentration of at least one contaminant in the gas in said inlet side and a concentration of said at least one contaminant in the gas in said outlet side; and determining at least one operating condition of said separator on the basis of said detected concentrations;

wherein said step of detecting a concentration comprises a gas chromatographic analysis.

18. Analysis apparatus, comprising:
an activated carbon filtration device with an inlet side and an outlet side;

a flow generator for generating a gas flow through said filtration device from said inlet side to said outlet side;

a gas chromatography analysis instrument configured to measure concentration of total organic carbon in the gas in said inlet side and in said outlet side, said analysis instrument being connected with at least one sampling point of gas samples from said inlet side and from said outlet side;

means for determining at least one operating condition on the basis of said measured concentration; and means for comparing a concentration of total organic carbon in said inlet side and a concentration of total organic carbon in said outlet side.

19. The apparatus according to claim 18, comprising:
a dehumidification device configured to dehumidify said gas flow, said analysis instrument being connected with a sampling point of a gas sample arranged downstream of said dehumidification device;

at least one gas condensing unit configured to dehumidify said gas flow, said analysis instrument being connected with a sampling point of a gas sample arranged upstream of said gas condensing unit; and means for determining at least one operating condition based on a concentration of total organic carbon downstream of said dehumidification device and for determining at least one operating condition based on the concentration of total organic carbon upstream of said gas condensing unit.

20. The apparatus according to claim 18, comprising an outlet connected to a dry process gas inlet of a container for dehumidifying incoherent plastics.

* * * * *